No. 829,444. PATENTED AUG. 28, 1906.
M. TOLTZ & F. T. KITCHEN.
PRESSURE REDUCING VALVE.
APPLICATION FILED NOV. 28, 1902.
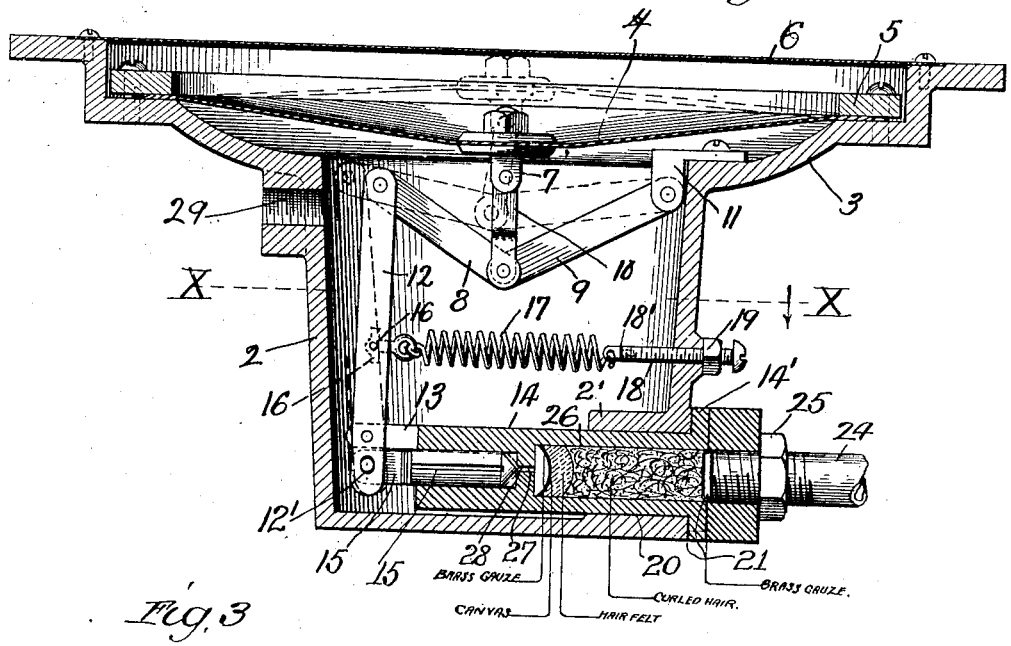
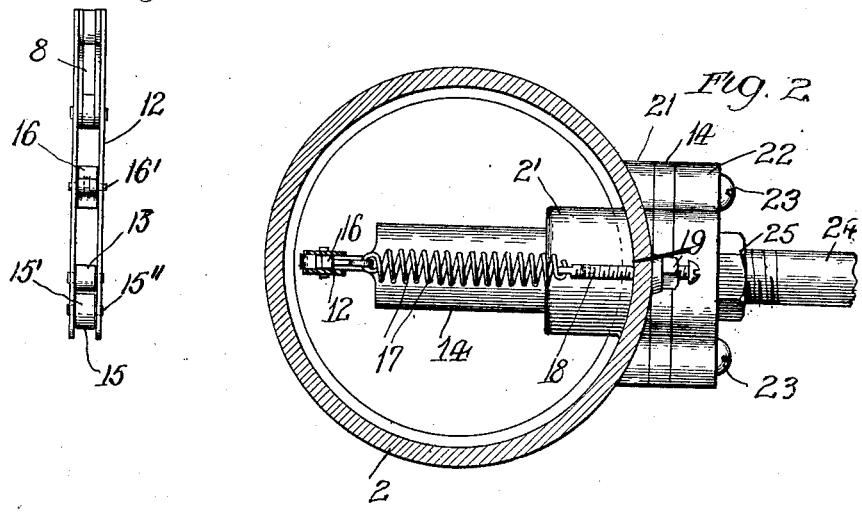
Witnesses:
Harold H Barrett
E. W. Norland
Inventors:
Max Toltz
Frederick T. Kitchen
By Hawley, Atty.

UNITED STATES PATENT OFFICE.

MAX TOLTZ AND FREDERICK T. KITCHEN, OF ST. PAUL, MINNESOTA.

PRESSURE-REDUCING VALVE.

No. 829,444.      Specification of Letters Patent.      Patented Aug. 28, 1906.

Application filed November 28, 1902. Serial No. 133,023.

*To all whom it may concern:*

Be it known that we, MAX TOLTZ and FREDERICK T. KITCHEN, residents of St. Paul, county of Ramsey, State of Minnesota, have invented certain new and useful Improvements in Pressure-Reducing Valves, of which the following is a specification.

Our invention relates to reducing-valves or gas-regulators, with special reference to reducing-valves that are adapted for employment in acetylene-gas systems.

The object of our invention is to provide a reducing-valve of simple and cheap construction which shall have few working parts and which will operate reliably and accurately.

The particular object of the invention is to improve the construction of spring-resisted reducing-valves or regulators.

The invention primarily consists in a gas pot or chamber having a low-pressure outlet, in combination with a valve-casing and valve communicating therewith and whereto the high-pressure pipe is connected, a diaphragm operable by the pressure of gas within said pot or chamber, a valve-actuating lever connected with said diaphragm, and a spring resisting the movement thereof; and our invention consists, further, in the combination of the spring-resisted valve-actuating lever and an operating diaphragm or piston with a toggle-lever connected between said lever and diaphragm, all in a reducing-valve substantially as hereinafter described, and particularly pointed out in the claims.

The invention will be more readily understood by reference to the accompanying drawings, forming a part of this specification, and in which—

Figure 1 is a vertical section of a reducing-valve or gas-regulator embodying our invention. Fig. 2 is a horizontal section thereof on the line *x x* of Fig. 1, and Fig. 3 is a detail of the valve-actuating lever.

As shown in the drawings, 2 represents the valve pot or chamber provided with the large top 3, in which the diaphragm 4 is arranged. Said diaphragm 4 closes the top of the pot and is held by a ring 5. The top of the pot or chamber is additionally closed by the plate 6, which also serves as a stop for the diaphragm in case the pressure of the gas within the pot is so great as to flex the connected levers.

7 is the center button or metallic fastening of the diaphragm, which is connected to the toggle-levers 8 and 9 by the pivotal link 10. The lever 9 is pivoted on the lug or block 11 within the chamber, while the opposite end of the lever 8 is pivoted in the upper end of the valve-actuating lever 12. To avoid the results of expansion and contraction, this lever 12 is pivoted on the lug 13 of the valve-casing 14, and it operates the pin or plunger valve 15, which is slidable in said casing 14. The lever 12, as shown, is preferably made in two parts, which straddle the lug 13 and also straddle the square end 15' of the valve 15. The valve carries the pin 15'', and the lever 12 is provided with a short slot 12' to permit freedom of movement between the lever and valve.

16 is a swivel-head pivoted by pin 16' between the parts of the lever 12. The eye is preferably swiveled in the head 16, and to it is connected the resisting tension-spring 17. The opposite end of the spring is attached to the swivel-eye 18', provided on the end of the adjusting-screw 18 that is threaded in the wall of the chamber 2 and whereof 19 is the locking-nut. By turning the screw the tension of the spring 17 may be adjusted as required to govern the inflow of high-pressure gas through the valve-casing. The valve-casing, as shown, is preferably a cylindrical sleeve that extends through a tight cylindrical bearing 20, provided therefor in the lug or boss 2', that is integral with the walls of the pot or chamber 2. This boss is extended on the exterior of the chamber to afford a flat seat 21 for the T-head 14' of the valve-casing. 22 represents a fusible cross-piece or block that is seated on the outer end of the valve-casing, both parts being held by the screws 23 23, that extend into the external boss on the pot. The high-pressure pipe 24 is screwed into the block 22 and the joint is made tight by the lock-nut 25. The pot or chamber is of iron, while the block 22 is made of a metal which is fusible at a low temperature, such as lead, whereby the connection between the regulator and the high-pressure pipe is opened in case of a conflagration. This is of particular value when the apparatus is used in distributing acetylene gas, which is liable to dissociation in the presence of great heat.

The bore 26 in the outer end of the valve-casing is preferably larger than the valve-bore and contains a gas-strainer composed of layers of such materials as curled hair, felt, and canvas, these being held in place by wire-gauze stoppers at the ends of the bore, as indicated in Fig. 1.

27 is the gas-valve opening, having a small conical seat at its inner end for the conical or pin point of the valve 15. The valve is preferably grooved longitudinally for the discharge of gas from the casing into the large pot or chamber 2.

29 represents the low-pressure gas-outlet of the regulator, from which the gas is conducted for use, as to the gas-burner pipes and burners.

The operation of our novel regulating-valve is as follows: The gas is admitted through the pipe 24 at a high pressure, varying according to the service to be performed or the pressure remaining in the service or storage tank from which the pipe extends. In passing through the strainer or filter within the valve-chamber the gas is relieved from all particles that might clog the small valve-aperture 27. Assuming that the pot or chamber is at this moment free from pressure, with its diaphragm depressed by gravity, the high-pressure gas will freely pass the open valve and quickly fill the valve-pot, being reduced in pressure by expansion into the larger chamber. The slightest pressure exerted upon the diaphragm from within the chamber will cause the diaphragm to rise and to carry with it the connecting-pivot of the toggle-levers 8 and 9. A sudden rush of gas into the empty pot will thus straighten the toggle, move the lever 12, and close the valve 15 against the tension of the spring 17 and the weight of the diaphragm and connected parts. The valve will be held closed until the pressure of gas within the pot is relieved at the outlet 29. As the gas is relieved the diaphragm and the toggle-center will fall, thus shortening the distance between the ends of the toggle-levers 8 and 9 and slightly opening the inlet-valve, through which gas will be admitted to maintain an unvarying pressure in the pot. The pressure within the pot is covered by the tension of the spring 17, by the adjustment of which any desired pressure reduction may be secured.

The special feature of our invention is the toggle-lever, by means of which the leverage upon the valve is made to increase in exact proportion to the increase of spring tension when the spring is distended by the rising diaphragm. It is obvious that the leverage of the diaphragm upon the valve-actuating lever decreases accurately and regularly when and as the spring is allowed to contract.

In addition to the foregoing our regulating-valve possesses the advantages of simplicity and low cost compared with the devices now on the market and adapted for like service.

It is obvious that numerous modifications of our invention will readily suggest themselves to one skilled in the art, and we therefore do not confine our invention to the specific constructions herein shown and described.

Having thus described our invention, we claim as new and desire to secure by Letters Patent—

1. In a pressure-regulator, a valve-pot covered by a diaphragm and provided with a suitable gas-outlet and a high-pressure inlet, a bearing extending into said pot, a valve-casing slidable in said bearing and removable from the outside of said pot, means for securing said casing, a high-pressure pipe, a fusible block connection between said high-pressure pipe and said valve-casing, a valve in said casing, and an actuating connection between said valve and said diaphragm, substantially as described.

2. In a pressure-regulator, a valve-pot having a suitable outlet, a high-pressure inlet near the bottom of said pot comprising a valve-casing extending into said pot and removable from the outside thereof, a valve in said casing, a high-pressure pipe, and a fusible block connection between said pipe and said valve-casing, in combination with an automatic valve-operating mechanism in said pot, substantially as described.

3. In a pressure-reducing valve, the combination, of a valve-pot having a gas-outlet, with a diaphragm, a valve-casing provided in said pot and removable from the exterior thereof, a high-pressure pipe, a fusible block connection between said pipe and valve-casing, a valve provided in said casing, a valve-resisting spring, and an actuating connection between said valve and said diaphragm, substantially as described.

4. The regulating-valve comprising a valve-pot having a suitable outlet, a high-pressure inlet and an automatic valve-operating mechanism in said pot, in combination, with the high-pressure pipe and a fusible valve connection on said pot, for said pipe, substantially as described.

5. In a pressure-regulating valve, a valve-pot, 2, provided with a wide flange, 3, the diaphragm, 4, attached thereto and having an outlet-valve, in combination with a circular boss, 2', a valve-casing, 14, circular in cross-section, slidable in a tight bearing, 20, and extending into and nearly across the pot, 2, at or near its lowest portions, to close proximity with the opposite side of said pot, said valve-casing containing a pin-valve, 15, and carrying a lug, 13, and an actuating connection within said pot between said diaphragm and said valve-casing and above said valve-casing, substantially as described.

In testimony whereof we have hereunto set our hands, this 24th day of November, 1902, at St. Paul, county of Ramsey, and State of Minnesota.

MAX TOLTZ.
FREDERICK T. KITCHEN.

Witnesses:
C. U. TUBBY,
R. D. HAWKINS.